July 20, 1943.  H. F. McLOUGHLIN ET AL  2,324,791
ELECTRICAL WIRING SYSTEM
Filed May 30, 1942  4 Sheets-Sheet 1
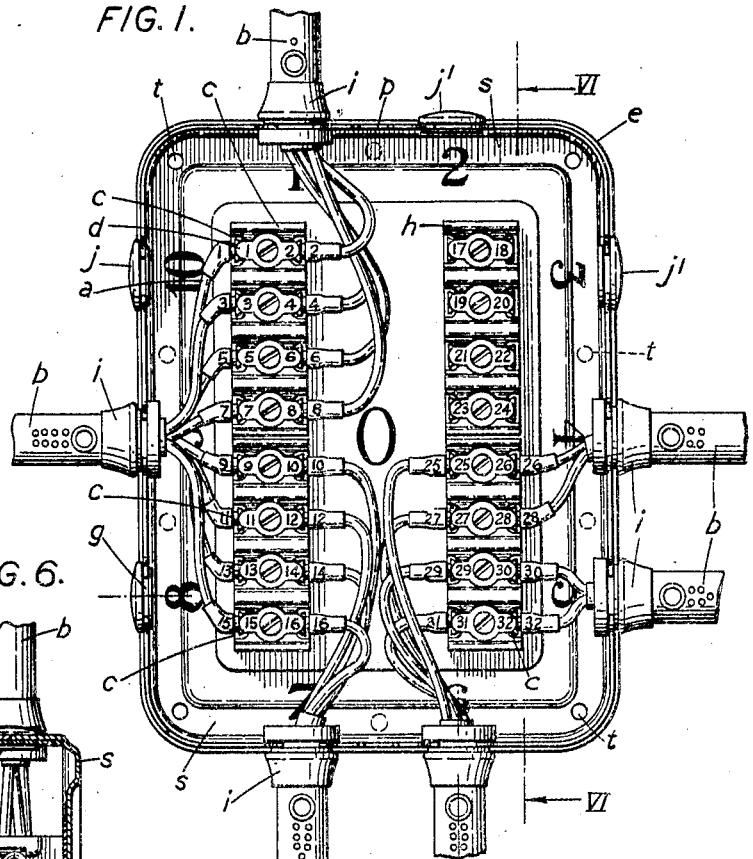
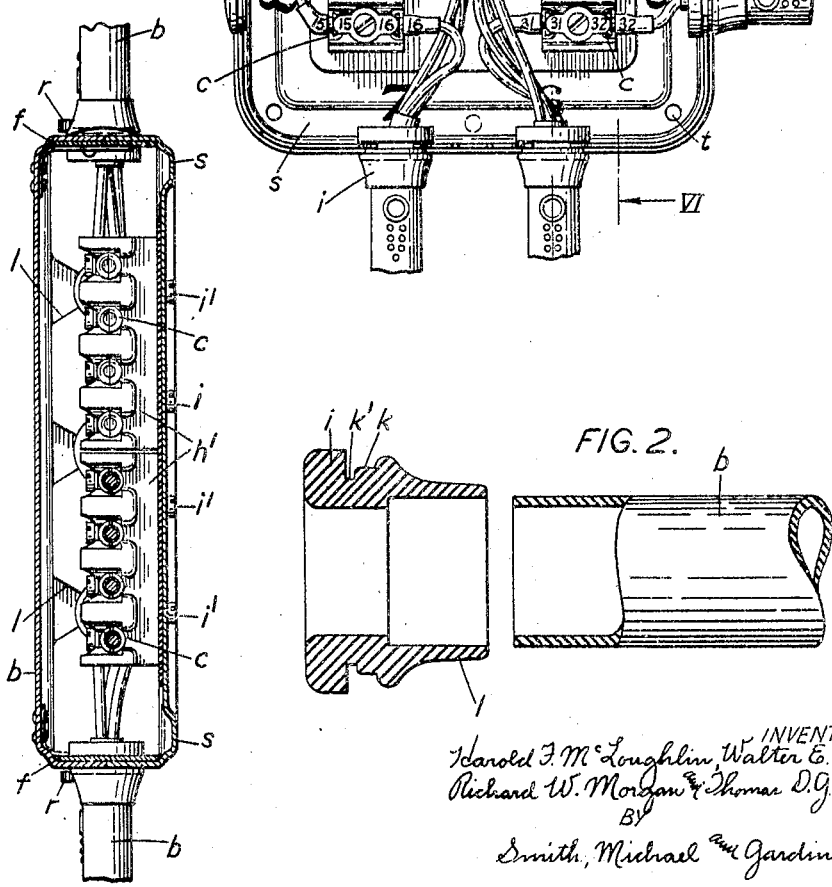
INVENTORS:-
Harold F. McLoughlin, Walter E. Idill,
Richard W. Morgan & Thomas D. G. Wintle,
BY
Smith, Michael and Gardiner,
ATTORNEYS.

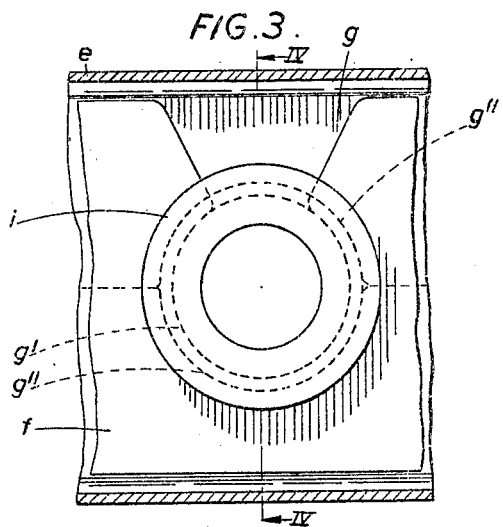
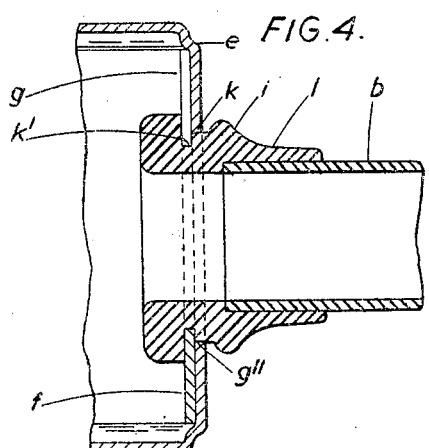
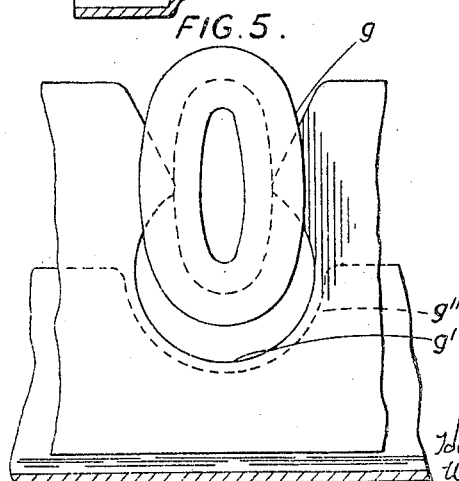

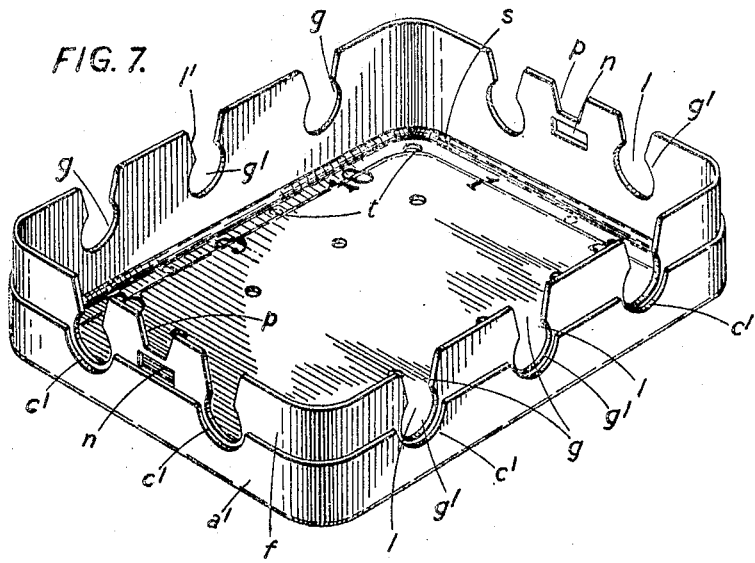
FIG. 7.
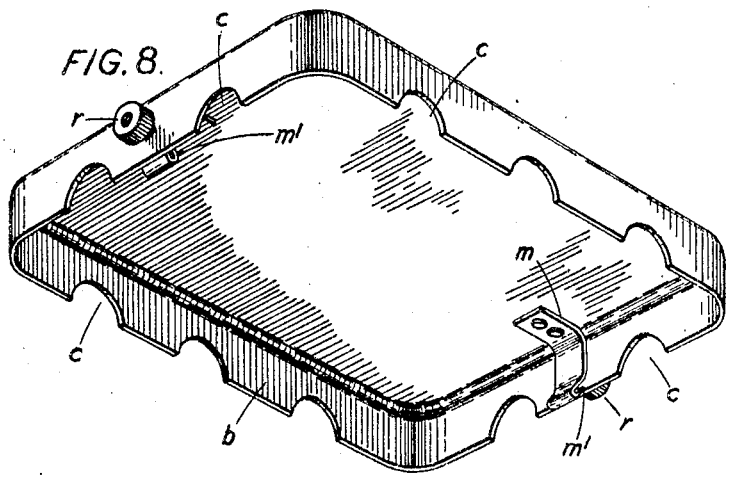
FIG. 8.
FIG. 9.
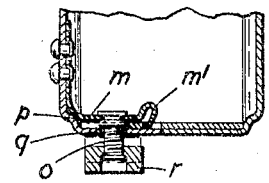

Patented July 20, 1943

2,324,791

UNITED STATES PATENT OFFICE 2,324,791

ELECTRICAL WIRING SYSTEM

Harold Fletcher McLoughlin, Shenstone Court, near Lichfield, Walter Edward Hill, Streetly, and Richard Walter Morgan and Thomas Daniel Guy Wintle, Walsall, England Application May 30, 1942, Serial No. 445,234
In Great Britain October 6, 1941

5 Claims. (Cl. 174—60)

This invention relates to improvements in and connected with electrical wiring systems and is more particularly concerned with the wiring of aircraft in which a large number of connections require to be made at junction boxes, distribution boxes and the like, situated between a generator and various electrically operated accessories. In the relatively confined space of an aeroplane the electrical wiring usually offers some difficulty and occupies considerable time, while maintenance and replacement of parts may result in the plane being out of commission for an undesirably long time. The object of the present invention is to provide an improved arrangement of compact and economical construction for facilitating the removable mounting of conduit tubes in the boxes, thereby minimising the time required for assemblage and for effecting inspection and renewal of parts.

A further object of the invention is to provide an improved construction of box for housing couplings and fuses, such box being of compact form and adapted to be economically produced. Another object of the invention is to provide an improved means for supporting lengths of flexible conduit tube between their ends.

According to this invention a number of conductors are loosely contained in a conduit tube or sheath, to the end of which is attached a grommet or bush adapted for introduction and withdrawal in a lateral direction to and from co-operating slots in a box. For this purpose the grommet, made of resilient material, may be formed with a pair of annular grooves of different depths, the co-operating slots producing openings of circular formation and aligning with key hole slots in a frame secured to the interior of the box which contains sockets adapted for the reception of individual plugs or terminal ends on the conductors. The improved arrangement enables a grommet and the end of a tube to be compressed for introduction passed the constricted part of a key hole slot, whereupon they expand so as to be held in position, the grooved formation engaging with the frame and the box to prevent axial movement. The improvements also enable expeditious assemblage and withdrawal when effecting renewal or replacement, and, in addition, result in a construction occupying a minimum space, since the insertion in a lateral direction permits fitting to be effected from the front of the box as contrasted with the axial movement in connecting and dis-connecting multiple-way couplings of the plug and socket type from the side of the box.

The box comprises a base and a lid which are preferably of similar construction to enable them to be produced from the same set of press tools, the side walls of each part being formed with a series of semi-circular openings so that when the lid is secured to the base there are provided circular openings for engagement in the grooves of the grommet. The slotted frame not only functions for supporting the ends of the conduit but also serves for stiffening the box which may consequently be made of relatively light weight metal. Extra openings may be provided in the frame and the box for the entry of additional cables, such openings being normally closed by removable discs until required for use. The bottom of the box is preferably provided near its marginal edge with a depressed rim apertured for the passage of securing screws for the box while affording a central dishing or clearance for the heads of the securing screws for insulating blocks on which are mounted sockets or fuse clips.

The lengths of flexible conduit tube are provided between their ends with grooved flexible rings or sleeves adapted to be supported in slotted plates. The arrangement enables the tube to be compressed together with a ring and introduced laterally into a slot in the plate, the periphery of the slot entering the groove to prevent axial displacement. The slot is preferably of key-hole formation so that compression of the ring and tube enables them to be passed through a constricted entry to a circular shaped portion, thereby holding the parts in position until they are again compressed to permit lateral withdrawal through the constricted entry.

In order to enable the invention to be readily understood and carried into effect, reference will now be made to the accompanying drawings, illustrating by way of example one construction in connection with the electrical wiring of aircraft, in which drawings—

Figure 1 is a plan view of the box with a portion of the lid removed to disclose the grommet mounting more clearly.

Figure 2 is a sectional elevation showing, to a larger scale, a grommet separated from the end of a conduit tube.

Figure 3 is a front elevation of part of a box with a grommet on the end of a tube mounted in position in slots in the box construction.

Figure 4 is a section on the line IV—IV of Figure 3.

Figure 5 is a view illustrating the manner of inserting and withdrawing a grommet to and from a slot in a box.

Figure 6 is a section on the line VI—VI with the lid in position.

Figure 7 is a perspective view of the base of the box the couplings and the conductors which are shown in Figure 1 being omitted.

Figure 8 is a perspective view of the lid.

Figure 9 is a sectional elevation of a box fastening.

Figure 10:
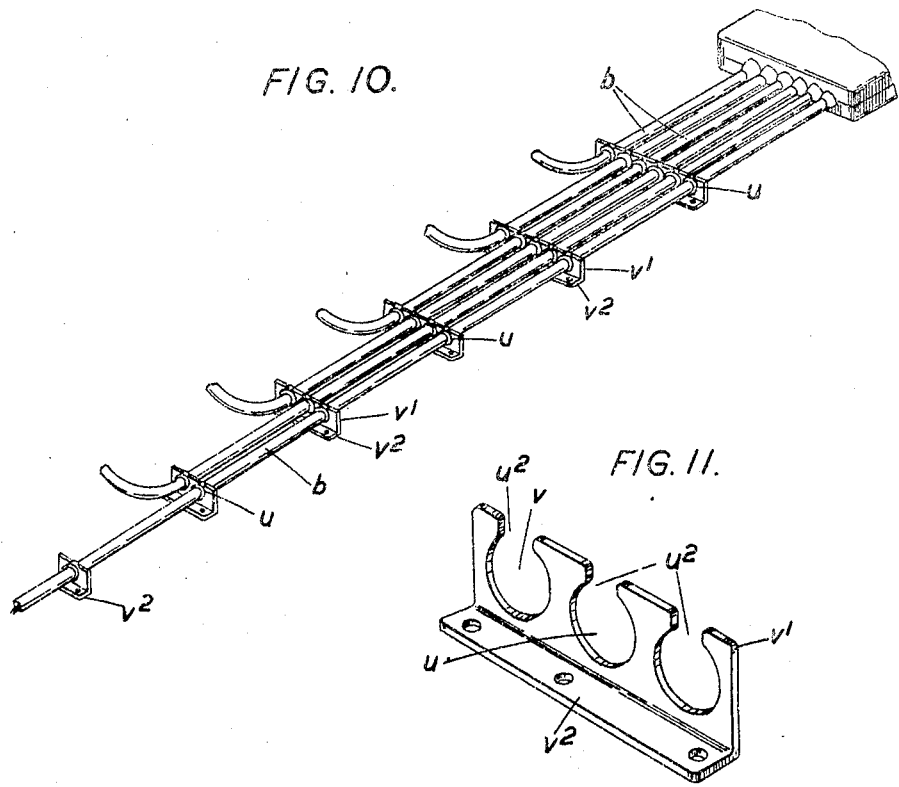
Figure 10 illustrates more or less diagrammatically the employment of plates having different numbers of slots and adapted for supporting lengths of conduit tube between their ends.
Figure 11:
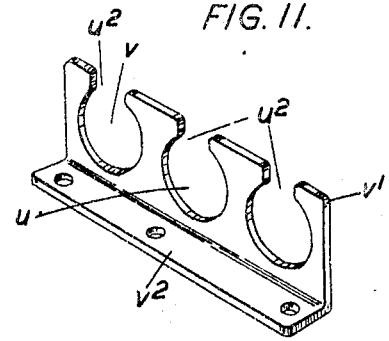
Figure 11 is a perspective view of a plate having three slots.

Referring to the drawings, the wiring system comprises mains leading from a generator and connected with distribution and connections boxes from which connections are made with various electrically controlled accessories or apparatus. The conductors $a$ employed in the system are loosely contained in conduit tubes $b$ and are provided at their ends with individual plugs $c$ adapted for introduction into socket members $d$ mounted in a box such as $e$. A rectangular frame $f$ is secured to the inside of the box and is formed along its upper edge with keyhole slots $g$, each comprising a wedge-shaped entry to a circular opening $g^1$ which is in alignment with and is of slightly smaller diameter than a circular opening $g^{11}$ in the box. The plugs $c$ are adapted to be releasably trapped in the sockets which are mounted on insulating blocks $h^1$ secured to the box by screws $i^1$ the heads of which are accommodated in a centrally dished part of the box lid. If desired certain of the circular openings may be closed by removable discs $j^1$ until conductors are required for introduction through them. The base $a^1$ and the lid $b^1$ of the box are formed with semi-circular openings $c^1$ so that when the lid is secured to the base, circular openings $g^{11}$ are provided each of which is adapted for engagement in an annular groove in a grommet.

Around the ends of the conduit tubes there are attached grommets or bushes $i$ for the mounting of the tubes in the boxes. Each grommet and its tube is made of resilient insulating material, such as polyvinyl chloride, the grommet being secured to the tube in any suitable manner, for example by the application of heat or by the employment of a suitable cementing composition. Each grommet, produced by moulding, is formed with a pair of annular grooves $kk^1$ of different depths, so that when it is compressed, together with the end of the tube, it can be introduced laterally, as illustrated in Figure 5, through the throat or constricted entry to the slot, whereupon by virtue of its resiliency it returns to its circular form, see Figure 3, so as to occupy the circular opening in the box and frame, the shallow groove $k$ seating the periphery of the opening $g^{11}$ in the box walls, while the deeper groove $k^1$ is occupied by the periphery of the circular portion of the opening $g$ in the frame. As a result the grommet is locked against axial withdrawal, while when the box lid is removed, the grommet and tube can be compressed to enable lateral withdrawal past the throat of the opening $g$. In addition the arrangement ensures a moisture-proof joint, the grommet having, if desired, a nozzle-like formation $l$ at its outer end so that any moisture is directed away from the box. It will be understood that withdrawal can be readily effected by compressing a grommet so that it assumes a form as shown in Figure 5 to enable its passage through the throat of the opening $g$.

The introduction and withdrawal of a cable end in a lateral direction enables mounting and withdrawal to be effected from the front of the box as contrasted with couplings which require to be coupled and uncoupled by movement of a plug or socket in the direction of the cable and from the side of the box. As a result the present arrangement not only facilitates installation and replacement but also provides a construction occupying a very small space. Furthermore, the relatively small diameter of the grommet enables the cable to which it is secured, to be passed through closely spaced parts of the aeroplane and thereby contributes to the ease of wiring. The loose disposition of the conductors within the conduit tube enables the latter to be compressed for deformation as previously described for introduction into, or withdrawal from, the box.

The lid is secured to the base by means of a pair of fastenings each of which comprises a spring blade $m$ (Figures 8 and 9) bent at right angles and having one end riveted to the lid and its free or flexing end formed with a hook $m^1$ for locking engagement with a rectangular opening $n$ in each end wall of the rectangular frame $f$ which is made of strip metal and riveted or welded to the inside of the base. The downturned arm has secured to it a screw $o$, extending outwardly through a slot $p$ in the frame and an opening $q$ in the lid and having a nut $r$ thereon. When it is desired to remove the lid from the base the nuts are turned so that each occupies the position as shown in Figure 9. They are thereupon pushed inwards to disengage the hooks $m^1$ from the opening $n$ to permit lifting of the lid. For securing the latter in position it is pressed downwards upon the base so that the hooks enter the openings $n$ whereupon the nuts are turned into the position shown in dotted lines in Figure 9.

For the purpose of facilitating the securing of a box in different locations a depressed rim $s$ at the perimeter of the base of the box may be formed with a series of knock-out openings $t$, appropriate ones being used for the passage of securing screws. Thus a uniform construction of box may be employed in spite of the fact that differently positioned securing screws may be required for different boxes. In the case of a fuse or distribution box, fuses are associated with the sockets $h$ and with fuse clips. In addition isolating switches for facilitating testing for the location of earth faults may be associated with such sockets and fuse clips.

Figure 12:
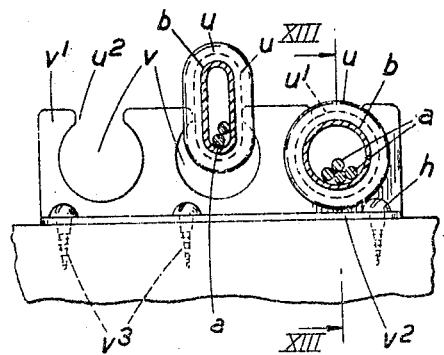
Figure 12 is a front view of the plate shown in Figure 11, a conduit tube being shown in position in one slot while the second tube is illustrated in process of introduction into another slot.
Figure 13:
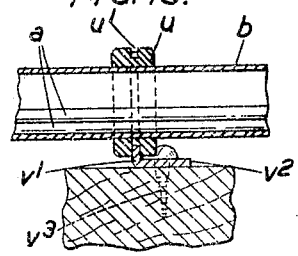
Figure 13 is a section on the line XIII—XIII of Figure 12.

Around each tube there are slidably arranged rubber rings $u$, Figures 10–13 formed with grooves $u^1$ and adapted for entering into slots $v$ in metal plates $v^1$ having flanged feet $v^2$ for enabling their attachment by screws $v^3$ to an aircraft structure. The slots $v$ are of key-hole formation, the constricted entries $u^2$ necessitating the compression of a ring $u$ and a tube $b$ to enable introduction or withdrawal to or from a slot as illustrated in Figure 12. After passing beyond the entry $u^2$, the parts are allowed to expand so that they occupy the position shown to the right of Figure 12, in which the groove $u^1$ is occupied by the periphery of the circular parts of the slot for preventing axial movement while lateral movement for withdrawal is prevented until pressure is exerted for enabling the passage of the parts through the constricted entry $u^2$. The supporting plates may be formed with any appropriate number of slots according to the number of conduit tubes to be supported as will be readily understood from Figure 10, in which six tubes emerging from a connection box are reduced in number by diversion of the tubes to other boxes until finally there remains only a single tube to be supported by a plate having one slot. The improved arrangement provides a simple and advantageous means for effectively supporting relatively long lengths of conduit tube, while enabling the latter to be quickly introduced and withdrawn from such supporting means.

We claim:

1. An electrical wiring system comprising a box, composed of a base and lid the side walls of which are formed with edge openings to produce circular openings when the lid is mounted on the base, a frame secured to the box and formed with keyhole slots each comprising a wedge-shaped entry to a circular opening disposed in alignment with, and of slightly smaller diameter than the circular opening provided by box parts, flexible conduit tubes of insulating material, and a grommet made of resilient material on the end of each tube and formed with a pair of annular grooves of different depths so that the grommet can be compressed together with the end of a tube and introduced laterally through a wedge-shaped entry and into a circular opening in the box and frame, the shallow groove seating the periphery of the opening in the box walls, while the deeper groove is occupied by the periphery of the circular opening in the frame.

2. In an electrical wiring system, the combination of a box comprising a base and a lid having in their side walls co-operating open-ended slots for producing circularly shaped openings when the lid is fastened to the base, a frame attached to the interior of the base and having key-hole shaped slots the circular portions of which are concentric with the circular openings in the box, flexible conduit tubes, and resilient grommets on the ends of the flexible conduit tubes, said grommets being formed with annular grooves receiving the marginal edges of the slats in the base, lid and frame and permitting lateral introduction and withdrawal of said conduits to and from the slots and openings.

3. An electrical wiring system comprising a flexible conduit tube, an annularly grooved flexible ring disposed on each said tube, and supporting plates formed with key-hole slots to enable a tube with a ring to be compressed and introduced laterally into a slot with the periphery of the slot entered in the groove of the ring.

4. In an electrical wiring system the combination with flexible conduit having a resilient grommet attached thereto, said grommet being provided with an annular groove opening radially outwardly thereof, of a support member for said conduit disposed in a plane transverse to the general axis of the conduit, said support member being provided with a key hole slot opening through one of its edges, said key hole slot having a restricted passage opening into a circular opening, the conduit and grommet being collapsible for passage through the restricted portion of the key hole slot, the walls of the circular portion of the slot being dimensioned to engage within the groove of the grommet as the grommet is moved laterally into the slot.

5. In an electrical wiring system, the combination of a box comprising a lid and base parts having cooperable telescopic flanges, the flange on one of said box parts being provided with open-ended keyhole slots, the cooperating flange of the other box part being provided with generally semi-circular open slots aligned with the keyhole slots when the lid is closed, and conduit tubes each having at one end thereof a resilient grommet, each grommet being annularly grooved and entered within a keyhole slot, the semi-circular slots of the flange of said other box part fitting snugly around said conduit when the lid is closed whereby to close the open ends of said keyhole slots.

HAROLD FLETCHER McLOUGHLIN.
WALTER EDWARD HILL.
RICHARD WALTER MORGAN.
THOMAS DANIEL GUY WINTLE.